United States Patent [19]
Hayakawa et al.

[11] 3,856,135
[45] Dec. 24, 1974

[54] CONVEYOR COVER ASSEMBLY

[75] Inventors: Masaya Hayakawa, Tokyo; Iki Harada, Yokohama; Fumiyoshi Yamagami, Tokyo, all of Japan

[73] Assignee: Bridgestone Tire Company Limited, Tokyo, Japan

[22] Filed: Sept. 7, 1973

[21] Appl. No.: 396,275

[30] Foreign Application Priority Data
Sept. 11, 1972  Japan.......................... 47-105080[U]
Sept. 11, 1972  Japan.............................. 48-57321

[52] U.S. Cl............................................ 198/204
[51] Int. Cl........................................... B65g 21/08
[58] Field of Search ............ 198/204, 213; 220/32; 312/284, 327

[56]  References Cited
UNITED STATES PATENTS
2,038,471  4/1936  Benatar............................ 198/204
2,955,702  10/1960  Long et al........................... 198/204
3,147,852  9/1964  Hanson.............................. 198/204
3,721,363  3/1973  Bressler et al. ....................... 220/32

FOREIGN PATENTS OR APPLICATIONS
536,423  1/1957  Canada............................. 198/204

Primary Examiner—Evon C. Blunk
Assistant Examiner—Jeffrey V. Nase
Attorney, Agent, or Firm—Sughrue, Rothwell, Mion, Zinn & Macpeak

[57]  ABSTRACT

A conveyor cover assembly comprising semi-cylindrical or similarly curved cover plate members and brackets secured to the support structure of a conveyor device. Each cover plate member is detachably hinged to the brackets by hinge shafts.

3 Claims, 12 Drawing Figures

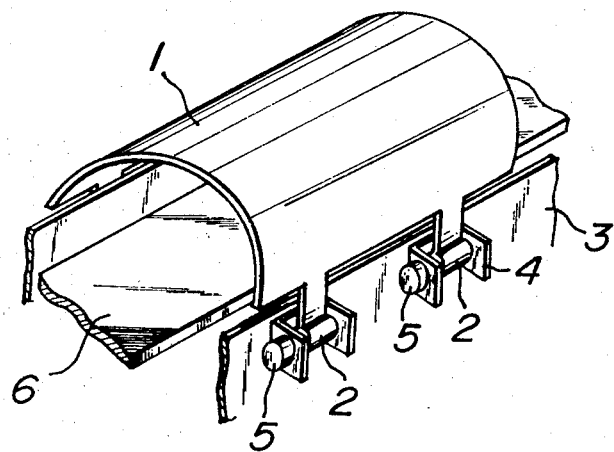
FIG_1
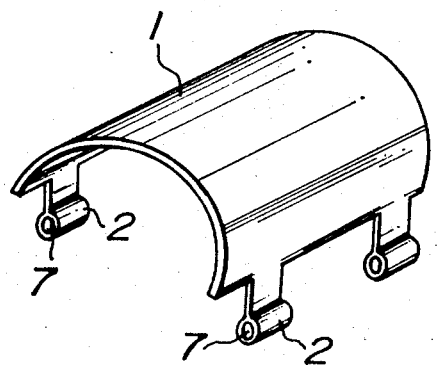
FIG_2
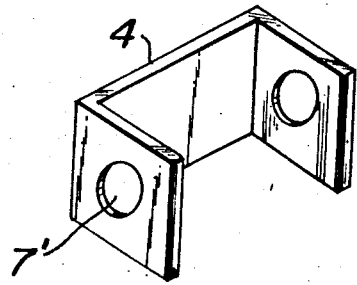
FIG_3

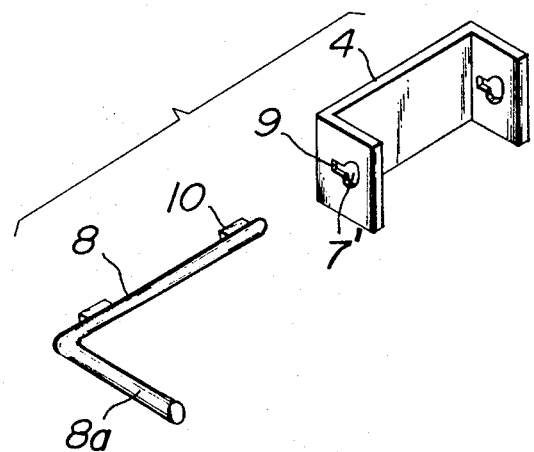
FIG_4
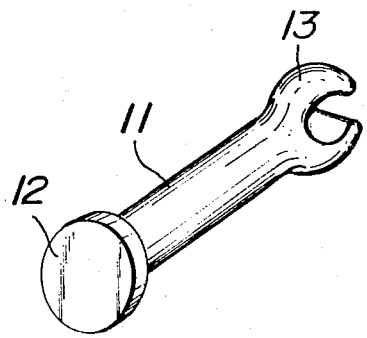
FIG_5

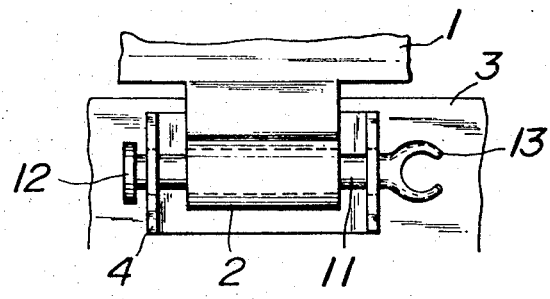
FIG_6
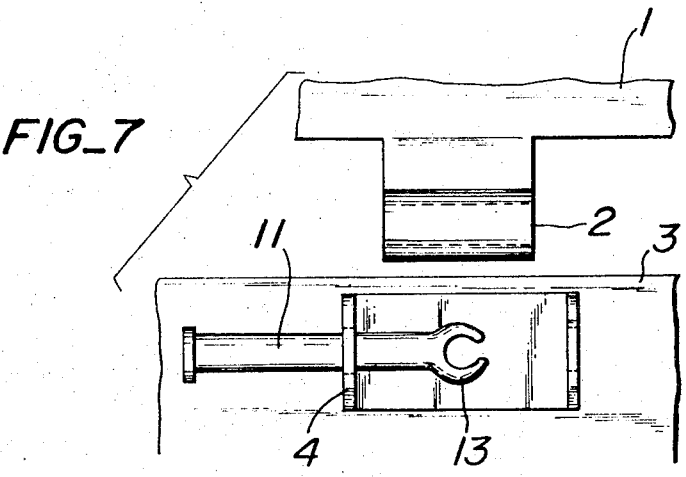
FIG_7
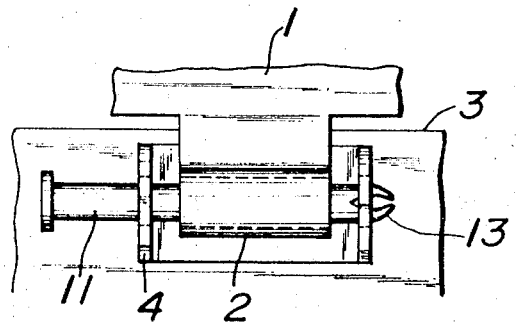
FIG_8

FIG_9
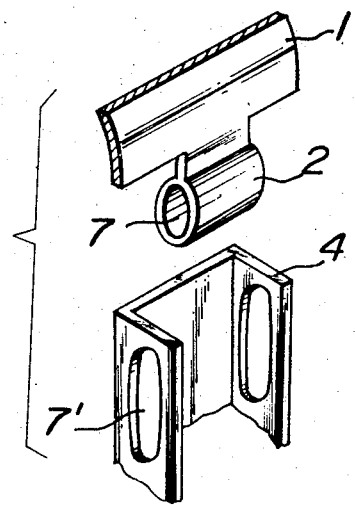
FIG_10
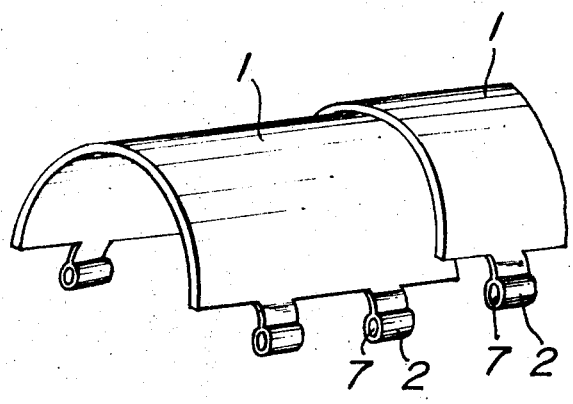

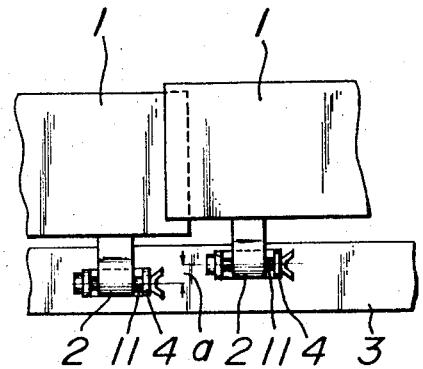
FIG_11
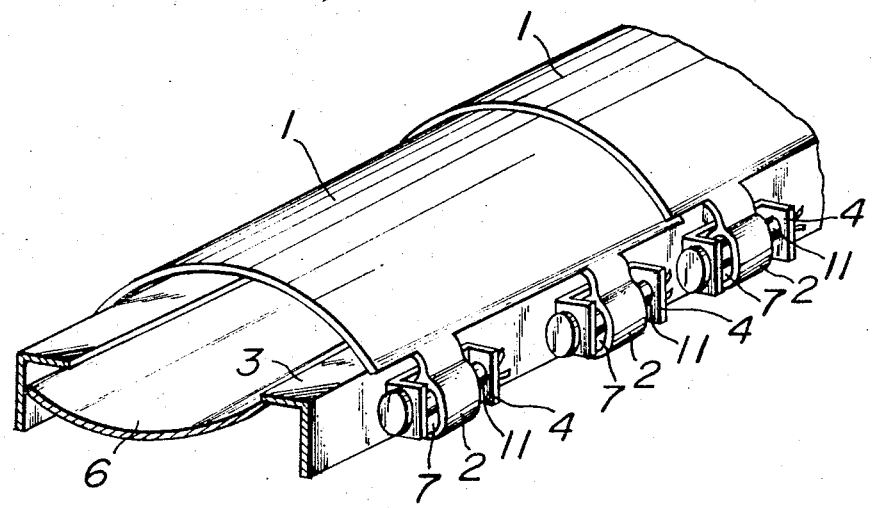
FIG_12

CONVEYOR COVER ASSEMBLY

BACKGROUND OF THE INVENTION

1. Field of the Invention

This invention relates to a conveyor cover assembly, and more particularly to a conveyor cover assembly which extends above and across a conveyor device carrying goods, e.g., ores, cement, and the like.

2. Description of the Prior Art

With conveyor devices which carry ores, cement, or other dust-producing goods, it has been a practice to place a conveyor cover over and across the conveyor device for preventing dust particles from being dispersed to the surrounding atmosphere. A typical conventional conveyor cover comprises cover plates made of metallic material, synthetic resin material, or slate material, and the conveyor cover is so disposed as to form a tunnel extending along the conveyor device.

A typical example of such conventional conveyor cover plates is of semi-cylindrical shape and has a central raised portion and a pair of lower edge portions having bolt holes, so that the conveyor cover can be directly bolted to support structure of the conveyor device by using the bolt holes of the lower edge portions thereof. Such conventional conveyor cover has shortcomings in that the installation thereof is laborious and time-consuming, that maintenance is difficult because the conveyor cover plates must be removed from and remounted to the conveyor support structure one by one by unbolting and bolting them at the lower edge portions thereof, and that each of the conveyor cover plates in trouble has to be completely removed from the conveyor support structure for repairing.

Therefore, an object of the present invention is to mitigate the aforesaid difficulties of the conventional conveyor cover by providing a new conveyor cover assembly which can be easily installed and readily maintained in proper operative conditions.

SUMMARY OF THE INVENTION

According to the present invention, there is provided a conveyor cover assembly comprising cover plate members which can be disposed over a conveyor device so as to define a continuous tunnel extending above the conveyor device, and a connector means for connecting edge portions of the cover members to a support structure of the conveyor device. Each of the cover plate members consists of a plate having a pair of substantially rectilinear parallel edge portions, and a raised covering surface extending between the two edge portions, each edge portion having at least one leg extending downwardly in a direction substantially opposite to the direction in which the covering surface is raised, each of said legs having an elongated hinge hole extending in parallel to the edge portions. The connector means comprises a plurality of brackets, one for each of the legs of the cover plate member. Each bracket of the connector means includes a web to be secured to the support structure of a conveyor device and a pair of end walls defining a space therebetween in which the lower end of the leg of the cover plate member is received. The two end walls have aligned bearing holes, so that a hinge shaft can be journalled thereby. The shaft is detachably journalled by the end walls of the bracket, so that the leg of the cover plate member can be detachably carried by the hinge shaft in a pivotally swingable manner upon insertion of the hinge shaft through the elongated hinge hole of the leg which is now located in the space between the two end walls. The brackets of the connector means are so mounted on the support structure of the conveyor device that, the cover plate members of the belt cover assembly are carried along the conveyor device while keeping the parallel edges of the cover plate members in parallel with the moving direction of the conveyor device, i.e., the moving direction of a belt or chain of the conveyor device.

In one of preferred embodiments of the invention, the hinge shaft is a lock shaft, so that once the hinge shaft is inserted in the bracket in position, it is free from accidental drop out from the bracket.

In another preferred embodiment of the invention, the hinge shaft is a pin consisting of a pin rod having a fixed head secured to one end thereof and a resiliently deformable enlarged portion formed at the opposite end thereof. The enlarged portion may be formed separately and secured to the opposite end of the pin. The dimension of the fixed head at right angles to the longitudinal axis of the pin shaft is large enough to prevent the pin from passing through the shaft holes of the bracket of the connector means. The deformable enlarged portion normally has a dimension which is also large enough to prevent the enlarged portion from passing through the shaft hole of the bracket and the elongated hinge hole of the cover member leg. Upon application of a compressive force, the resilient enlarged portion can be contacted in such a manner that it can pass through the shaft holes of the bracket and the elongated hinge hole of the cover plate member leg. With the pin of such construction, the cover plate member can be selectively mounted to and dismounted from the brackets of the connector means.

With the conveyor cover assembly of the invention, each cover plate member can be fixed to the support structure of a conveyor device by means of the hinge shafts which extend through the elongated hinge holes of the cover plate member legs and which are journalled by the brackets of the connector means. It is also possible to swing the cover plate member about the hinge shaft at one side edge thereof, upon releasing the leg or legs on the opposite side edge thereof. As a result, the inspection of goods being conveyed and the maintenance of the conveyor device can be carried out simply by swinging the cover plate members so as to open the conveyor cover assembly. Thus, the need of complete removal of the cover plate members from the conveyor device for inspection and maintenance is eliminated. The cover members can be, of course, swung either to the right or to the left of the moving direction of the conveyor device.

BRIEF DESCRIPTION OF THE DRAWING

For a better understanding of the invention, reference is made to the accompanying drawing, in which:

FIG. 1 is a partial schematic perspective view of a conveyor cover assembly as installed on a conveyor device;

FIG. 2 is a perspective view of a cover plate member to be used in the conveyor cover assembly of Fig. 1;

FIG. 3 is a perspective view of a connector bracket which is to be secured to the support structure of a conveyor device for pivotally holding the cover plate member;

FIG. 4 is an exploded view of a combination of a key shaft and a bracket for pivotally holding the cover plate member;

FIG. 5 is a perspective view of a pin having a resiliently deformable enlarged portion;

FIGS. 6 to 8 are diagrammatic illustrations, showing the manner in which the pin of FIG. 5 is used for pivotally holding the cover plate member; and FIGS. 9 to 12 are schematic illustrations of different arrangements for assembling a plurality of the cover plate members in a partially overlapped fashion.

Like parts are designated by like numerals throughout the different figures of the drawing.

DESCRIPTION OF THE PREFERRED EMBODIMENTS

Referring to FIG. 1, cover plate members 1 (only one is shown) extend over a belt conveyor 6 so as to cover the space between opposing side edges of the belt conveyor 6. The cover plate member 1 has a central raised portion and parallel edges having legs 2. In the illustrated embodiment, the cover plate member is a plate or shell of substantially semi-cylindrical shape, but the invention is not restricted to such shape. As long as the central portion is raised for providing a proper space from the moving part of a conveyor device, e.g., a belt conveyor, any shape of the cover plate member can be used. A plurality of brackets 4 are secured to support structure 3 of the conveyor device. Each bracket 4 has a pair of spaced parallel end walls having aligned shaft holes 7', as shown in FIG. 3. The leg 2 of the cover plate member 1 has a tubular portion at the lower end thereof, and the tubular portion provides a hinge hole 7, as shown in FIG. 2. The cover plate member 1 can be pivotally connected to the support structure 3 by inserting a hinge shaft 5 through aligned shaft holes 7' of the brackets 4 and the hinge hole 7 of the leg 2 of the cover plate member 1.

To facilitate the replacement of the cover plate member 1, the hinge shaft 5 is detachably inserted in the holes 7 and 7', as will be described hereinafter. It is apparent that, when all the legs 2 on both side edges of the cover plate member 1 are connected to the brackets, the cover plate member 1 is fixed to the support structure 3, while releasing of one side edge of the cover plate member 1 will allow it to swing about the hinge shaft 5 which pivotally holds the other side edge of the cover plate member 1.

At least one leg 2 should be provided on each side edge of the cover plate member 1. Perferably, two or more legs 2 may be formed on one side edge of the cover plate member 1 depending on the size of cover plate member, so as to ensure stable operation thereof. The direction of the hinge hole 7 in each leg 2 must be in parallel to the moving direction of the conveyor belt 6, or any other movable conveying means of the conveyor device, for allowing the cover plate member 1 to swing across the movable conveying means about the hinge shaft 5 extending through the hinge hole 7.

The cover plate member 1 can be made of any material which is suitable for preventing dust dispersion from the conveyor device to the surrounding atmosphere. A perferable material of the cover plate member 1 is fiberglass reinforced plastic (FRP), in view of the lightness and the high corrosion resistance of FRP.

To supplement the mechanical strength, the cover plate member 1 may be corrugated or provided with suitable ribs (not shown). The cover plate member 1 may be of channel shape, if so desired, but the illustrated semi-cylindrical shell shape is preferable from the standpoint of mechanical strength.

The illustrated bracket 4 has a web extending between the two end walls, and the web may be welded to the support structure 3. The shape of the bracket 4 is not restricted to that of FIG. 3, but brackets of any other suitable shape may be used in the conveyor cover assembly of the invention, as long as the bracket can pivotally hold the cover plate member 1 through the hinge bolt 5. The hinge bolt 5 can be of any configuration which is suitable for pivotally connecting the cover plate member 1 to the bracket 4 through the hinge hole 7 of the leg 2 of the cover plate member 1.

FIG. 4 illustrates a lock shaft 8, which can be used as the aforesaid hinge shaft. The lock shaft 8 has one or more detents 10. In a bracket 4 to be used together with the lock shaft 8, each shaft hole 7' of the end wall of the bracket 4 must have a key hole 9 for selectively passing the detent 10 therethrough. It is apparent that the detent 10 of the lock shaft 8 can pass through the shaft hole 7' of the bracket end wall only when the detent 10 is aligned with the key hole 9. Accordingly, if the lock shaft 8 is so turned as to angularly dispace the detent 10 away from the corresponding key holes 9 after connecting the leg 2 of the cover plate member 1 to the bracket 4, the cover plate member 1 can be locked as connected to the support structure 3 through the bracket 4. In this case, the hinge hole 7 of the leg 2 should also have a corresponding key hole (not shown). The illustrated lock shaft 8 has a bent handle 8a for facilitating such turning thereof; namely, locking and unlocking by turning the shaft 8.

FIG. 5 illustrates a hinge pin 11 which is particularly preferable for the conveyor cover assembly of the invention. The hinge pin 11 has a fixed head 12 secured to one end thereof. The head 12 of the illustrated embodiment is disk-shaped, and its diameter is larger than the diameter of the shaft hole 7' of the bracket 4. Whereby, the head 12 prevents the hinge pin 11 from passing through the bracket 4. The hinge pin 11 has a resiliently contractible enlarged portion 13 which is formed at the opposite end thereof. A rod extends between the fixed head 12 and the enlarged portion 13, and the diameter of the rod is small enough to pass through the shaft holes 7' of the bracket 4 and the hinge hole 7 of the leg 2 of the cover plate member 1. The enlarged portion 13 normally assumes a large dimension which is larger than the shaft hole 7' of the bracket 4, but it is contractible to such a small dimension that it can pass through the hinge hole 7 of the leg 2 and the shaft hole 7' of the bracket 4 when contracted.

The operation of the hinge pin 11 will be described by referring to FIGS. 6, 7, and 8. FIG. 6 shows the manner in which the hinge pin 11 pivotally connects the cover plate member 1 to the bracket 4 by extending through the shaft holes 7' of the bracket 4 and the hinge hole 7 of the leg 2 of the cover plate member 1. The enlarged portion 13 assumes its enlarged state for holding the leg 2 of the cover plate member 1, so that the hinge pin 11 never drops out of the shaft hole 7' of the bracket 4, until an operator applies an external force so as to resiliently contract the enlarged portion 13. When the enlarged portion 13 is resiliently contracted, the hinge pin 11 can be removed through the shaft hole 7' of the bracket 4 and the hinge hole 7 of the leg 2 of the cover plate member 1, as can be seen from Fig. 8. After the cover plate member 1 is separated from the hinge pin 11, the enlarged portion 13 resumes its enlarged state, so that it can remain on the bracket 4, as shown in Fig. 7.

To mount the cover plate member 1 to the bracket 4 by using the hinge pin 11, the enlarged portion 13 is resiliently contracted and pushed through the hinge hole 7 of the leg 2 and the shaft hole 7' of the bracket 4, as shown in FIG. 8. After completing the connection, the enlarged portion 13 resumes its enlarged state for keeping the cover plate member 1 as connected to the bracket 4, as shown in Fig. 6. The illustrated embodiment of the enlarged portion 13 may be formed of two movable elements which are resiliently related to each other in such a manner that, when the hinge pin 11 is pushed into the hinge hole 7 of the leg 2 or the shaft hole 7' of the bracket 4, the two movable elements may move toward each other in response to such pushing force so that the enlarged portion 13 can be resiliently contracted automatically.

On the other hand, when the hinge pin 11 is pulled away from the shaft hole 7' of the bracket 4 or the hinge hole 7 of the leg 2, the two movable elements of the enlarged portion 13 may resist to such pulling force and stay as separated from each other. Thus, in order to remove the hinge pin 11 from the bracket 4 or the leg 2, the operator must directly apply an external force to the two elements of the enlarged portion 13 for resiliently contracting the enlarged portion 13. After contracting the enlarged portion 13, the operator may pull the fixed head 12 to the left, as seen in FIG. 8, so as to retard the thus contracted portion 13 through the shaft hole 7' of the bracket 4 and the hinge hole 7 of the leg 2, until the hinge pin 11 is completely separated from the leg 2. Then, the cover plate member 1 can be removed from the bracket 4, as shown in FIG. 7.

If, however, the circumstances allow, the two movable elements of the enlarged portion 13 may be so formed as to contract by themselves when a leftwardly directed pulling force which is larger than a certain predetermined magnitude is applied to the hinge pin 11, as seen in FIG. 6.

The fixed head 12 of the hinge pin 11 is not restricted to be disk-shaped, but it can be rectangular or any other suitable shape as long as the fixed head prevents the movement of the entire hinge pin 11 through the shaft hole 7' of the bracket 4 or the hinge hole 7 of the leg 2 of the cover plate member 1. Instead of the illustrated two movable elements, three or more movable elements may be used to constitute the enlarged portion 13.

The illustrated hinge pin 11 is made of a resilient plastic material. It is also possible to make the hinge pin 11 by using a metallic or non-metallic material.

Referring to FIGS. 10 and 11, a plurality of the cover plate members 1 are disposed along a conveyor device with a part of the end portions of adjacent cover plate members 1 overlapped with each other. To this end, the adjacent connection means 4, i.e., the brackets, for the overlapped end portions of the adjacent cover plate members 1 are vertically offset by a distance a, as clearly shown in FIG. 11. Accordingly, in mounting the brackets 4 on the conveyor support structure 3, due care must be taken so as to align them in both horizontal and vertical directions.

There are two approaches for eliminating the aforesaid need for the vertical offset of the brackets 4. Referring to FIG. 9, the bracket 4 may be so modified as to provide vertically elongated shaft slots 7' on opposing end walls thereof, instead of the substantially circular shaft holes 7' of FIG. 3. As apparent to those skilled in the art, with such vertically elongated slots 7', the brackets 4 themselves may be aligned on a horizontal line while allowing the partial overlapping of the cover plate members 1, as shown in FIG. 10. Referring to FIG. 12, it is also possible to form a vertically elongated hinge hole 7 through the lower end portion of the leg 2 of the cover plate member 1, for the purpose of eliminating the vertical offset of the brackets 4. More particularly, in FIG. 12, a connecting hinge pin 11 passes through the upper edge portion of the hinge slot 7 of the lower one of the overlapped adjacent cover plate members 1, while passing the lower edge portion of the hinge slot 7 of the upper one of the adjacent cover plate members 1. The elimination of the vertical offst will simplify the installation of the brackets on the conveyor support structure 3.

As described in detail in the foregoing disclosure, the present invention provides a conveyor cover assembly, which can be easily opened for inspection and maintenance, and hinged connections at the opposing edges of cover plate members allow the opening operation of the cover assembly either to the right or to the left of the moving direction of the conveyor device. The hinge pin 11, as shown in FIG. 5, ensures easy connection and disconnection of the cover plate members 1 relative to the brackets 4, and the hinge pins 11 can be left on the brackets 4 after separating the leg 2 of the cover plate member 1 from the bracket 4, so as to provide for quick reconnection of the leg 2 to the bracket 4 upon completion of inspection or maintenance work. In short, the present invention provides a conveyor cover assembly which is easy to install, inspect, and maintain.

We claim:

1. A conveyor cover assembly comprising a plurality of cover plate members, each having a pair of substantially rectilinear parallel edge portions and a raised covering surface extending between the two edge portions, each edge portion having at last one leg extending downwardly in a direction substantially opposite to the direction in which the covering surface is raised, said leg having a hinge hole extending therethrough in parallel to said edge portion; a plurality of brackets, one for each said leg, said bracket having parallel end walls defining a leg-receiving space therebetween, each said end wall having a shaft hole; and hinge shafts which are detachably mounted in the brackets so as to pivotally connect said legs to the brackets by extending through said shaft holes of the bracket and said hinge hole of the leg disposed in said leg-receiving space of the bracket, each consisting of a rod having a fixed head secured to one end thereof and a resiliently deformable enlarged portion secured to the opposite end thereof, said fixed head having a dimension at right angles to the longitudinal direction of the rod, which dimension is large enough to inhibit passage of the fixed head through said shaft hole of said bracket end wall, said enlarged portion normally assuming a dimension at right angles to the longitudinal direction of the rod, which dimension is large enough to inhibit passage thereof through said shaft hole of the bracket end wall and said hinge hole of said leg, but said enlarged portion being deformable to a smaller dimension for allowing passage thereof through said shaft hole of the bracket end wall and the hinge hole of said leg.

2. A conveyor cover assembly according to claim 1, wherein said shaft hole of said bracket end wall is an elongated slot, said slot being elongated in the same direction as that in which the leg extends.

3. A conveyor cover assembly according to claim 1, wherein said hinge hole of said leg of said cover plate member is elongated in the same direction as that in which the leg extends.

* * * * *